United States Patent [19]
Hur

[11] Patent Number: 5,751,493
[45] Date of Patent: May 12, 1998

[54] HEAD-MOUNTED DISPLAY APPARATUS WITH A SINGLE IMAGE DISPLAY DEVICE

[75] Inventor: Se-Hurn Hur, Seoul, Rep. of Korea

[73] Assignee: Daewoo Electronics Co., Ltd., Rep. of Korea

[21] Appl. No.: 806,886

[22] Filed: Feb. 25, 1997

[30] Foreign Application Priority Data

Nov. 15, 1996 [KR] Rep. of Korea ............... 96-54562
Nov. 15, 1996 [KR] Rep. of Korea ............... 96-54563

[51] Int. Cl.$^6$ ............................................ G02B 27/14
[52] U.S. Cl. ................................. 359/630; 359/631
[58] Field of Search ............................ 359/630, 631, 359/633; 345/7, 8

[56] References Cited

U.S. PATENT DOCUMENTS

| | | | |
|---|---|---|---|
| 4,082,432 | 4/1978 | Kirschner | 359/631 |
| 4,575,722 | 3/1986 | Anderson | 340/783 |
| 5,189,452 | 2/1993 | Hodson et al. | 353/94 |
| 5,198,928 | 3/1993 | Chauvin | 359/465 |
| 5,348,477 | 9/1994 | Welch et al. | 434/43 |
| 5,467,205 | 11/1995 | Kuba et al. | 359/40 |
| 5,497,271 | 3/1996 | Mulvanny et al. | 359/631 |
| 5,654,827 | 8/1997 | Reichert | 359/631 |

FOREIGN PATENT DOCUMENTS

2261804 10/1992 United Kingdom.
9510106 4/1995 WIPO.

*Primary Examiner*—Georgia Y. Epps
*Assistant Examiner*—Ricky Mack
*Attorney, Agent, or Firm*—Pennie & Edmonds LLP

[57] ABSTRACT

A head-mounted display apparatus comprises an image display device for displaying images, a first beam splitter for partially transmitting and partially reflecting light from the image display device, a second beam splitter for partially transmitting and partially reflecting the light transmitted by the first beam splitter, and a first and a second concave reflection mirrors. The image display device, disposed on the right side of an observer, displays images on the basis of video signals from a video signal source. The first and the second beam splitters are disposed in front of the right and the left eyes of the observer, respectively. The first and the second concave reflection mirrors are disposed on the reflection side of the first and the second beam splitter, and reflect the light therefrom to the right and the left eyes of the observer, respectively. The head-mounted display apparatus of the present invention can also provide a stereoscopic vision by displaying images on the image display device on the basis of the principle of binocular parallax.

16 Claims, 4 Drawing Sheets

HEAD-MOUNTED DISPLAY APPARATUS WITH A SINGLE IMAGE DISPLAY DEVICE

FIELD OF THE INVENTION

The present invention relates to a head-mounted display apparatus; and, more particularly, to a head-mounted display apparatus incorporating therein a single image display device.

DESCRIPTION OF THE PRIOR ART

There is shown in FIG. 1 a schematic diagram of a conventional head-mounted display apparatus comprising a pair of image display devices 1, 2, e.g., liquid crystal displays, and a pair of magnifying lenses 3, 4.

The image display devices 1, 2, disposed in front of left and right eyes 5, 6 of an observer, respectively, are connected to a video signal source (not shown) and display images on the basis of video signals therefrom.

The magnifying lenses 3, 4 are positioned between the left image display device 1 and the left eye 5 and between the right image display device 2 and the right eye 6, respectively, thereby enabling the observer to see enlarged virtual images formed at a certain distance from the eyes 5, 6.

However, such a conventional head-mounted display apparatus is fairly heavy, making it burdensome on the observer's head, as a result of the presence of two image display devices. In addition, there exists a complicated circuit for transmitting the video signals to the individual image display device.

SUMMARY OF THE INVENTION

It is, therefore, a primary object of the invention to provide a head-mounted display apparatus having a reduced weight and a simplified circuit network by incorporating therein a single image display device.

In accordance with an aspect of the present invention, there is provided a head-mounted display apparatus comprising: an image display device for displaying images; a first beam splitter for partially transmitting and partially reflecting light from the image display device; a second beam splitter for partially transmitting and partially reflecting the light transmitted by the first beam splitter; and a first and a second concave reflection mirrors for reflecting the light reflected by the first and the second beam splitters to one eye and the other eye of an observer, respectively.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 1:
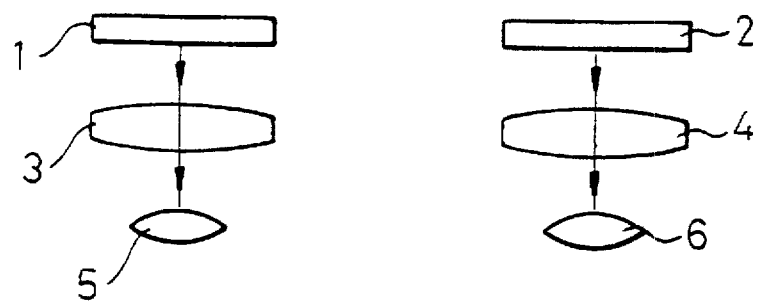
FIG. 1 shows a schematic diagram of a conventional head-mounted display apparatus.
Figure 2:
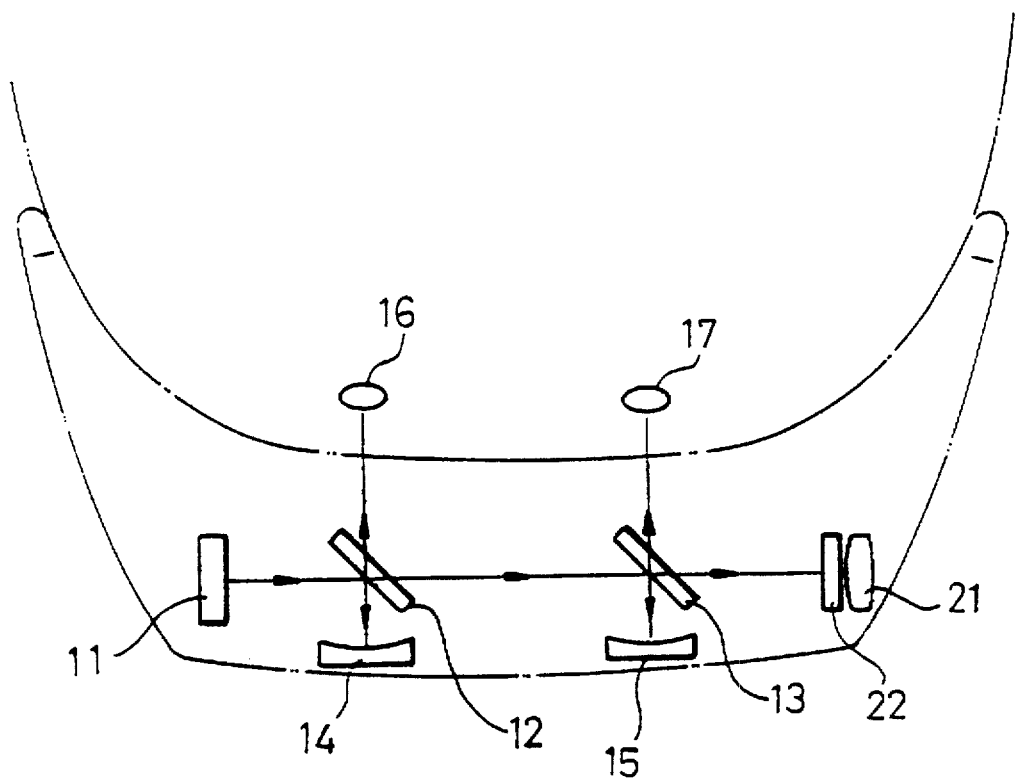
FIGS. 2 and 3 illustrate a schematic diagram and a schematic perspective view of a head-mounted display apparatus in accordance with a preferred embodiment of the present invention, respectively.
Figure 3:
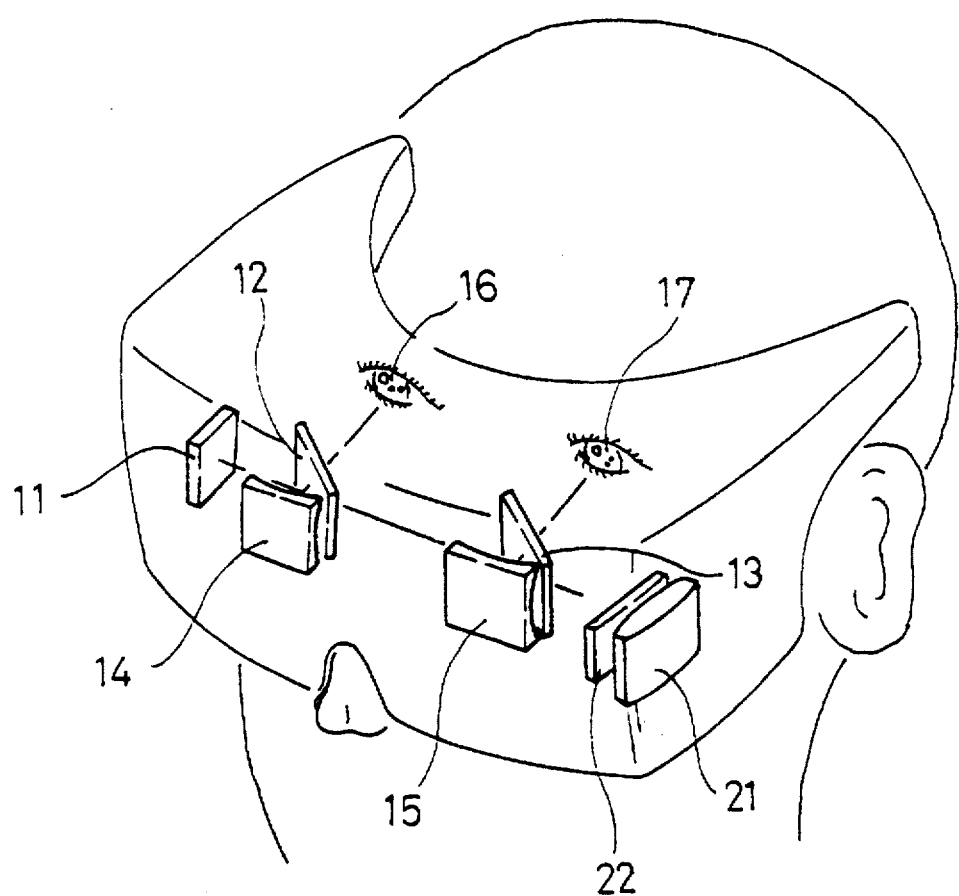

There are respectively shown in FIGS. 2 and 3 a schematic diagram and a schematic perspective view of a head-mounted display apparatus in accordance with a preferred embodiment of the present invention. The head-mounted display apparatus of the first preferred embodiment comprises an image display device 11, e.g., a liquid crystal display or cathode ray tube, a first beam splitter 12 for partially transmitting and partially reflecting light from the image display device 11 in proportion of 3:1, a second beam splitter 13 for partially transmitting and partially reflecting the light transmitted by the first beam splitter 12 in proportion of 1:1, and a first and a second concave reflection mirrors 14, 15.

The image display device 11, disposed on, e.g., the right side of an observer, is connected to a video signal source (not shown) such as a personal computer, a video cassette recorder, a laser disc player, etc., and displays images on the basis of video signals therefrom.

The first and the second beam splitters 12, 13 are disposed in front of right and left eyes 16, 17 of the observer, respectively. The first beam splitter 12 transmits 75% of the light from the image display device 11 to the second beam splitter 13 and reflects 25% of the light from the image display device 11 to the first concave reflection mirror 14. Then, 75% of the light from the first concave reflection mirror 14, i.e., 18.75% of the light from the image display device 11, is transmitted through the first beam splitter 12 to the right eye 16. On the other hand, the second beam splitter 13 reflects 50% of the light from the first beam splitter 12 to the second concave reflection mirror 15 and transmits the rest of the light. Then, 50% of the light from the second concave reflection mirror 15, i.e., 18.75% of the light from the image display device 11, is transmitted through the second beam splitter 13 to the left eye 17. In this way, the same amount of light enters both eyes 16, 17.

Disposed on the opposite side of the image display device 11 is a convex lens 21 which transmits the light from the second beam splitter 13 to outside, thereby allowing the images displayed on the image display device 11 to be viewed from the outside. In addition, a shutter 22 is disposed in front of the convex lens 21 in the direction of transmission through the second beam splitter 13 so that the images displayed on the image display device 11 are selectively viewed from the outside by opening or closing the shutter 22. It is appreciated that the shutter 22 may be disposed behind the convex lens 21.

The head-mounted display apparatus of the present invention can also provide a stereoscopic vision by displaying images on the image display device on the basis of the principle of binocular parallax.

Figure 4:
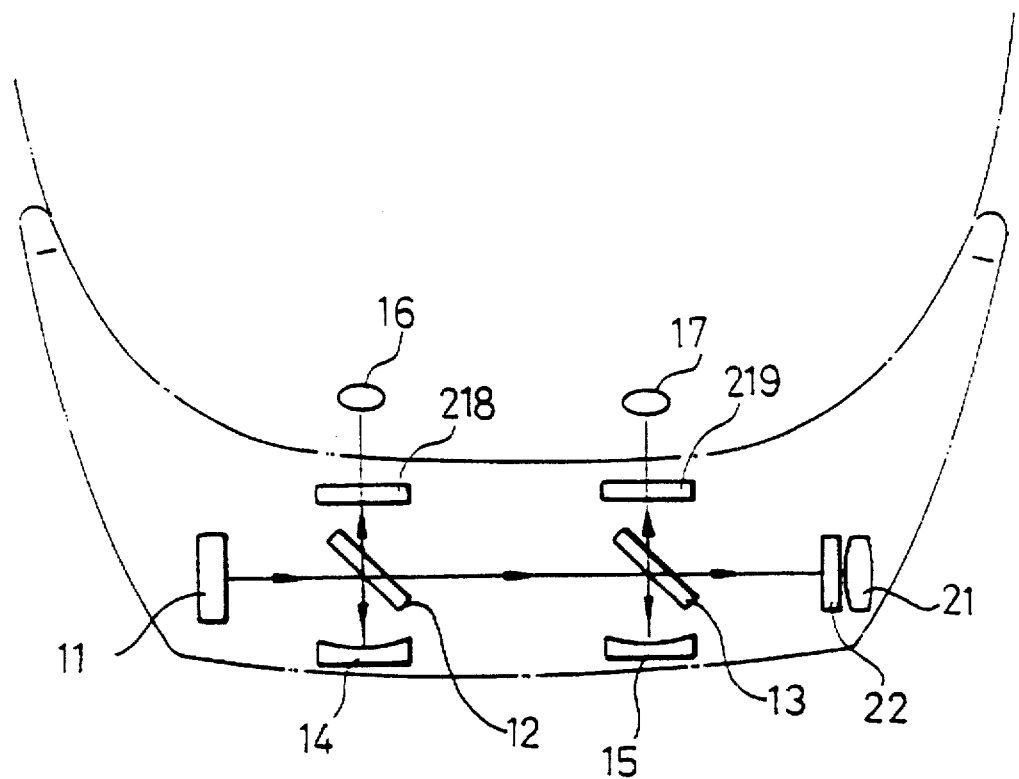
FIGS. 4 and 5 present a schematic diagram and a schematic perspective view of a head-mounted display apparatus in accordance with another preferred embodiment of the present invention, respectively.
Figure 5:
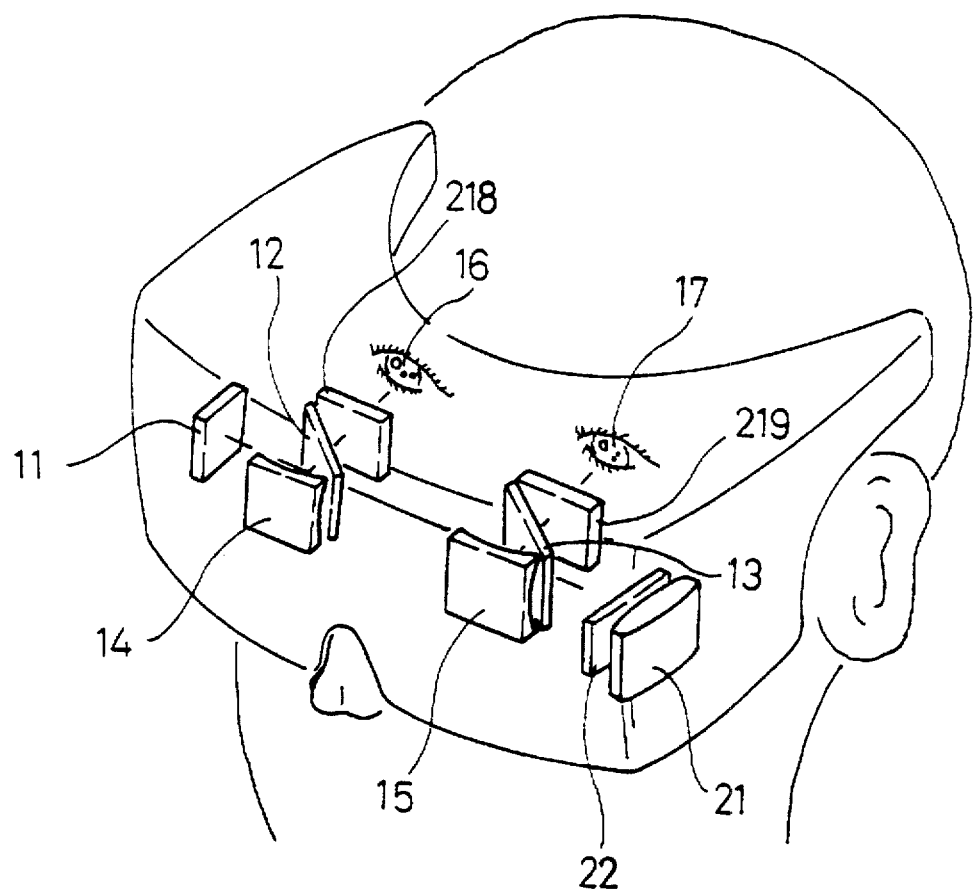

There are respectively shown in FIGS. 4 and 5 a schematic diagram and a schematic perspective view of a head-mounted display apparatus in accordance with another preferred embodiment of the present invention, which provides a stereoscopic vision. The head-mounted display apparatus of the second preferred embodiment, as compared with the first, further comprises a first and a second shutter glasses 218, 219 disposed between the first beam splitter 12 and the right eye 16 and between the second beam splitter 13 and the left eye 17, respectively, wherein the image display device 11 alternately displays right-eye and left-eye images photographed from two different directions or angles.

The first and the second shutter glasses 218, 219, synchronized with the right-eye and the left-eye images displayed on the image display device 11, become alternately clear and cloudy so that the observer is able to see three dimensional images. The shutter glasses 218, 219 are made of a liquid crystal material, and disclosed in detail in U.S.

Pat. Nos. 4,907,860 and 5,539,423, which are incorporated herein by reference.

In such head-mounted display apparatus of the present invention, since only one image display device is required, the weight thereof is decreased, thereby reducing the degree of burden on the observer's head. In addition, the circuit for transmitting the image signals becomes simplified.

Although the invention has been shown and described with respect to the preferred embodiments, it will be understood by those skilled in the art that various changes and modifications may be made without departing from the spirit and scope of the invention as defined in the following claims.

What is claimed is:

1. A head-mounted display apparatus comprising:
   an image display device for displaying images;
   a first beam splitter for partially transmitting and partially reflecting light from the image display device in proportion of 3:1;
   a second beam splitter for partially transmitting and partially reflecting the light transmitted by the first beam splitter in proportion of 1:1; and
   a first and a second concave reflection mirrors for reflecting the light reflected by the first and the second beam splitters to one eye and the other eye of an observer, respectively.

2. The apparatus of claim 1, further comprising means for allowing the images displayed on the image display device to be viewed from outside.

3. The apparatus of claim 2, wherein the means for allowing the images to be viewed from the outside includes a lens which is disposed in such a way that the light from the second beam splitter is transmitted therethrough to the outside.

4. The apparatus of claim 3, wherein a shutter is disposed in front of the lens so that the images displayed the image display device is selectively viewed from the outside by opening or closing the shutter.

5. The apparatus of claim 1, further comprising a first and a second shutter glasses disposed between the first beam splitter and one eye of the observer and between the second beam splitter and the other eye of the observer, respectively, wherein the image display device alternately displays right-eye and left-eye images photographed from different angles, and the first and the second shutter glasses, synchronized with the right-eye and the left-eye images displayed on the image display device, become alternately clear and cloudy so that the observer is able to see three dimensional images.

6. The apparatus of claim 5, wherein the first beam splitter partially transmits and partially reflects the light from the image display device in proportion of 3:1, and the second beam splitter partially transmits and partially reflects the light transmitted by the first beam splitter in proportion of 1:1, thereby allowing the same amount of light to enter the eyes of the observer.

7. The apparatus of claim 5, further comprising means for allowing the images displayed on the image display device to be viewed from outside.

8. The apparatus of claim 7, wherein the means for allowing the images to be viewed from the outside includes a lens which is disposed in such a way that the light from the second beam splitter is transmitted therethrough to the outside.

9. The apparatus of claim 8, wherein a shutter is disposed in front of the lens so that the images displayed the image display device is selectively viewed from the outside by opening or closing the shutter.

10. A head-mounted display apparatus comprising:
    an image display device for displaying images;
    a first beam splitter for partially transmitting and partially reflecting light from the image display device;
    a second beam splitter for partially transmitting and partially reflecting the light transmitted by the first beam splitter;
    a first and a second concave reflection mirrors for reflecting the light reflected by the first and the second beam splitters to one eye and the other eye of an observer, respectively;
    a lens disposed in such a way that the light from the second beam splitter is transmitted therethrough to outside, the lens allowing the images displayed on the image display device to be viewed from the outside; and
    a shutter disposed in front of the lens so that the images displayed on the image display device is selectively viewed from the outside by opening or closing the shutter.

11. The apparatus of claim 10, wherein the first beam splitter partially transmits and partially reflects the light from the image display device in proportion of 3:1, and the second beam splitter partially transmits and partially reflects the light transmitted by the first beam splitter in proportion of 1:1, thereby allowing the same amount of light to enter the eyes of the observer.

12. A head-mounted display apparatus comprising:
    an image display device for displaying images;
    a first beam splitter for partially transmitting and partially reflecting light from the image display device;
    a second beam splitter for partially transmitting and partially reflecting the light transmitted by the first beam splitter;
    a first and a second concave reflection mirrors for reflecting the light reflected by the first and the second beam splitters to one eye and the other eye of an observer, respectively; and
    a first and a second shutter glasses disposed between the first beam splitter and one eye of the observer and between the second beam splitter and the other eye of the observer, respectively, wherein the image display device alternately displays right-eye and left-eye images photographed from different angles, and the first and the second shutter glasses, synchronized with the right-eye and the left-eye images displayed on the image display device, become alternately clear and cloudy to allow the observer to see three dimensional images.

13. The apparatus of claim 12, wherein the first beam splitter partially transmits and partially reflects the light from the image display device in proportion of 3:1, and the second beam splitter partially transmits and partially reflects the light transmitted by the first beam splitter in proportion of 1:1, thereby allowing the same amount of light to enter the eyes of the observer.

14. The apparatus of claim 12, further comprising means for allowing the images displayed on the image display device to be viewed from outside.

15. The apparatus of claim 14, wherein the means for allowing the images to be viewed from the outside includes a lens which is disposed in such a way that the light from the second beam splitter is transmitted therethrough to the outside.

16. The apparatus of claim 15, wherein a shutter is disposed in front of the lens so that the images displayed on the image display device is selectively viewed from the outside by opening or closing the shutter.

* * * * *